United States Patent
Li et al.

(10) Patent No.: US 10,370,956 B2
(45) Date of Patent: Aug. 6, 2019

(54) PRESSURE GAUGE INSENSITIVE TO EXTRANEOUS MECHANICAL LOADINGS

(71) Applicant: Weatherford Technology Holdings, LLC, Houston, TX (US)

(72) Inventors: Hongbo Li, North Potomac, MD (US); Arthur Chu, Burtonsville, MD (US); Patrick Schmahl, Silver Spring, MD (US); John Niemczuk, Kensington, MD (US)

(73) Assignee: Weatherford Technology Holdings, LLC, Houston, TX (US)

( * ) Notice: Subject to any disclaimer, the term of this patent is extended or adjusted under 35 U.S.C. 154(b) by 211 days.

(21) Appl. No.: 15/047,303

(22) Filed: Feb. 18, 2016

(65) Prior Publication Data

US 2017/0241257 A1  Aug. 24, 2017

(51) Int. Cl.

| | |
|---|---|
| *E21B 47/06* | (2012.01) |
| *G01L 9/00* | (2006.01) |
| *G01L 11/02* | (2006.01) |
| *G01L 19/06* | (2006.01) |
| *G01L 19/14* | (2006.01) |
| *E21B 47/01* | (2012.01) |

(52) U.S. Cl.
CPC ............ *E21B 47/06* (2013.01); *E21B 47/011* (2013.01); *G01L 9/0039* (2013.01); *G01L 9/0079* (2013.01); *G01L 11/02* (2013.01); *G01L 19/06* (2013.01); *G01L 19/143* (2013.01)

(58) Field of Classification Search
None
See application file for complete search history.

(56) References Cited

U.S. PATENT DOCUMENTS

| | | | |
|---|---|---|---|
| 6,082,454 A | 7/2000 | Tubel | |
| 6,422,084 B1* | 7/2002 | Fernald | ................ G01L 11/025 |
| | | | 250/231.19 |
| 6,439,055 B1* | 8/2002 | Maron | ..................... G01L 9/06 |
| | | | 73/705 |

(Continued)

FOREIGN PATENT DOCUMENTS

| | | |
|---|---|---|
| EP | 2940246 A1 | 11/2015 |
| WO | 8902512 A1 | 3/1989 |

(Continued)

OTHER PUBLICATIONS

International Search Report and Written Opinion—PCT/US2017/017930—ISA/EPO—dated Apr. 13, 2017.

*Primary Examiner* — Jill E Culler
(74) *Attorney, Agent, or Firm* — Patterson + Sheridan, LLP (57) ABSTRACT

Methods, apparatus, and systems are provided for sensing pressure. One example apparatus includes a housing having a first port, a chamber disposed in the housing and having a second port, wherein the second port is coupled to the first port such that a volume inside the chamber is in fluid communication with an environment external to the housing, and a pressure sensor assembly at least partially disposed in the chamber and configured to sense a pressure of a fluid in the chamber. The chamber may be mechanically coupled to the housing via a portion of an exterior surface of the chamber such that a pressure response of the pressure sensor assembly is independent of extraneous loading on the housing.

20 Claims, 5 Drawing Sheets

(56) References Cited

U.S. PATENT DOCUMENTS

| | | | |
|---|---|---|---|
| 6,442,304 B1* | 8/2002 | Crawley | E21B 47/011 374/E11.016 |
| 7,017,417 B2* | 3/2006 | Daigle | E21B 47/011 73/705 |
| 7,437,027 B2* | 10/2008 | Zerwekh | E21B 47/06 385/12 |
| 7,597,142 B2 | 10/2009 | Hartog et al. | |
| 7,617,873 B2 | 11/2009 | Lovell et al. | |
| 2003/0233882 A1* | 12/2003 | Mei | G01L 9/0072 73/718 |
| 2013/0145852 A1 | 6/2013 | Guida et al. | |
| 2015/0117810 A1 | 4/2015 | Taverner et al. | |
| 2016/0011066 A1 | 1/2016 | Taverner et al. | |

FOREIGN PATENT DOCUMENTS

| | | |
|---|---|---|
| WO | 99/13307 A1 | 3/1999 |
| WO | 2007/149733 A2 | 12/2007 |

\* cited by examiner

PRESSURE GAUGE INSENSITIVE TO EXTRANEOUS MECHANICAL LOADINGS

BACKGROUND

Field

Embodiments of the present disclosure generally relate to downhole sensing and, more particularly, to pressure sensing assemblies in tubing that are insensitive to mechanical loads on the tubing, other than the pressure to be measured.

Description of the Related Art

The world's reservoirs are aging. This translates to increased water production and gas coning, increased lifting costs, expensive treatment of produced water, and high cost of deferred or lost hydrocarbon production. Hence, it is becoming increasingly important to accurately measure and understand conditions inside a well, reservoir, or field. Downhole sensing offers measurement near the areas of interest—e.g., near the wellbore or reservoir—and thus offers potential for higher quality data, more insight across a sandface, and measurement of parameters that are not available on the surface. This information can be used to optimize production, locate water or gas coning, manage fractures or fluid movement in the reservoir from events or disturbances, etc.

Various types (e.g., optical) of sensors may be used for sensing pressure and/or temperature in production tubing located in a wellbore completion for producing hydrocarbons. Traditional tubing strings, in which multiple lengths of tubing are coupled together, or coiled tubing may be deployed in the wellbore completion. In coiled tubing deployments, a length of tubing, which may be of a length appropriate for the depth of the completion, may be spooled onto a take-up reel. During installation, the tubing can be straightened and, using an injector head, can be run into the completion. Because coiled tubing is meant to be spooled onto and unspooled from a reel, the diameter of a coiled tube may be less than the diameter of traditional production tubing.

Several challenges exist with constructing sensors for use in production tubing, especially for coiled tubing deployments. One of these challenges is that the sensor may be subjected to unknown external mechanical loadings such as tension, bending, torsion, and external pressure once the sensor is installed downhole. If the pressure sensing mechanism of the sensor is not properly isolated from its outer shell component, the pressure response of the sensor under the external mechanical loadings will deviate from that obtained during calibration of the sensor under lab conditions. The deviation is dependent on the external loading conditions and can lead to high error in the measured pressure, thus rendering the sensor inaccurate.

There is therefore a need for techniques and apparatus to accurately measure pressure downhole and in other applications while avoiding the introduction of inaccuracy caused by extraneous mechanical loads noted above.

SUMMARY OF THE INVENTION

Embodiments of the present disclosure generally relate to sensing pressure, where the sensor is insensitive to extraneous mechanical loads. Such insensitive pressure sensors may be deployed in coiled tubing, as single sensors with each on individual instrument cables, or as a string of serial sensors along a single instrument cable, for example.

One embodiment of the present disclosure is an apparatus for determining pressures (e.g., associated with a conduit). The apparatus generally includes a housing having a first port, a chamber disposed in the housing and having a second port, wherein the second port is coupled to the first port such that a volume inside the chamber is in fluid communication with an environment external to the housing, and a pressure sensor assembly at least partially disposed in the chamber and configured to sense a pressure of a fluid in the chamber. The chamber is mechanically coupled to the housing via a portion of an exterior surface of the chamber such that a pressure response of the pressure sensor assembly is independent of extraneous loading on the housing.

Another embodiment of the present disclosure is a method for sensing pressure. The method generally includes exposing a first port of an apparatus to an environment at a location, wherein the apparatus includes a housing having the first port, wherein the environment is external to the housing; a chamber disposed in the housing and having a second port, wherein the second port is coupled to the first port such that a volume inside the chamber is in fluid communication with the environment; and a pressure sensor assembly at least partially disposed in the chamber, wherein the chamber is mechanically coupled to the housing via a portion of an exterior surface of the chamber such that a pressure response of the pressure sensor assembly is independent of extraneous loading on the housing; and sensing a pressure of a fluid in the chamber with the pressure sensor assembly.

Yet another embodiment of the present disclosure is a system for determining pressures associated with a conduit. The system generally includes a conductor; an apparatus comprising a housing having a first port, a chamber disposed in the housing and having a second port, wherein the second port is coupled to the first port such that a volume inside the chamber is in fluid communication with an environment external to the housing, and a pressure sensor assembly at least partially disposed in the chamber and configured to sense a pressure of a fluid in the chamber, wherein the chamber is mechanically coupled to the housing via a portion of an exterior surface of the chamber such that a pressure response of the pressure sensor assembly is independent of extraneous loading on the housing; and a processor configured to process signals received from the pressure sensor assembly via the conductor.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Aspects of the present disclosure provide techniques that may improve performance of pressure sensing systems measuring pressure within a wellbore. For example, the techniques may allow improved accuracy of downhole pressure measurements.

As mentioned above, multi-point electronic and optical sensors and distributed optical sensors have been developed and installed in wells to measure various downhole parameters. While accurate measurement of pressure at locations of interest may be useful in managing production from a well, accuracy of previous types of pressure sensors can be negatively impacted by mechanical (e.g., torsion, bending) loads applied to pressure sensors. When the pressure sensors are installed downhole, extraneous mechanical loads on the pressure sensors cannot be observed, and thus the accuracy of the sensors may be strongly affected with very little or no indication that the accuracy is being affected by the extraneous mechanical loads.

Accordingly, what are needed are techniques and apparatus to perform pressure measurements while preventing the application of undesirable mechanical loads to the pressure sensing mechanisms.

Example Coiled-Tubing Downhole Sensing System

Figure 1:
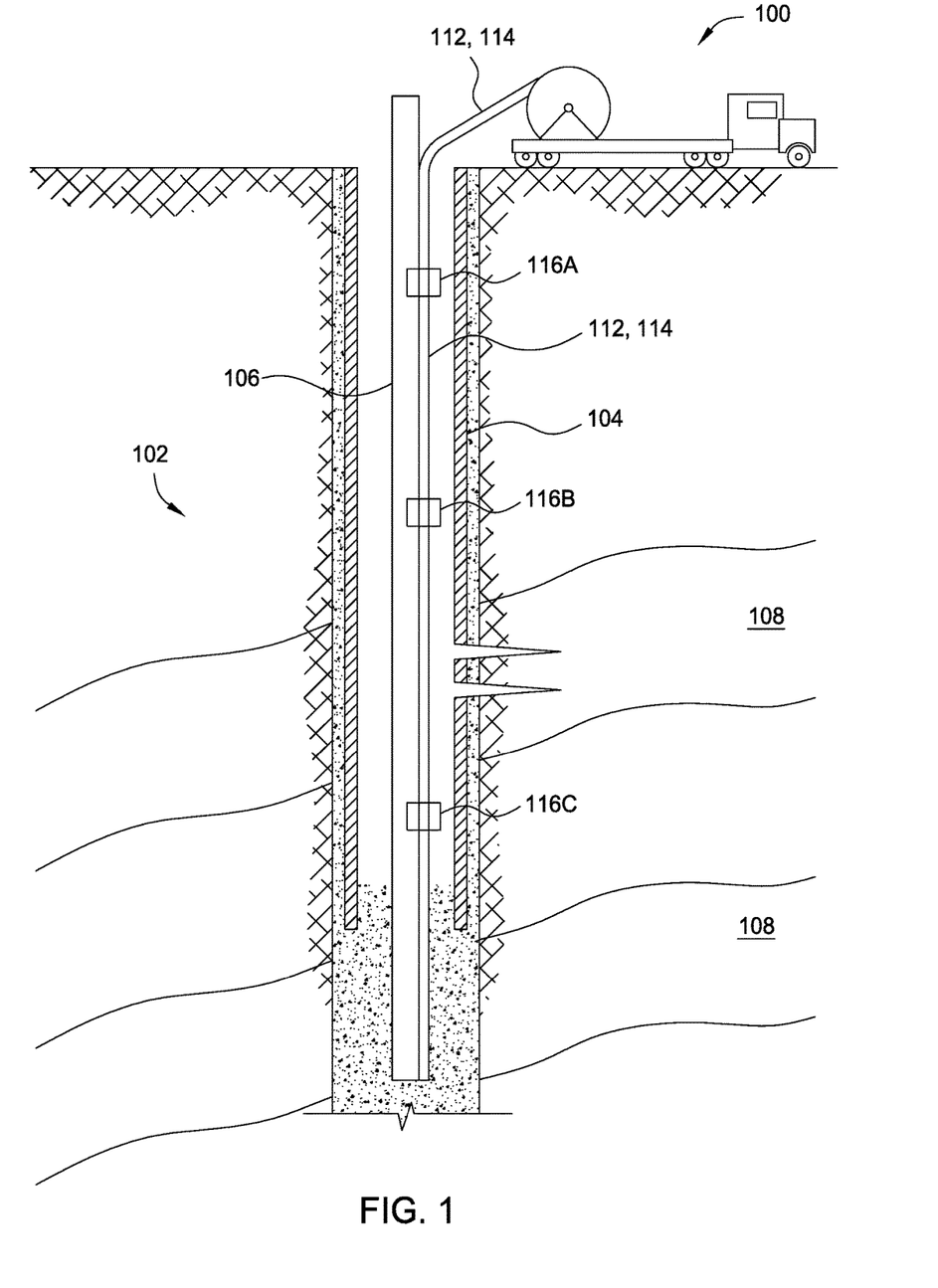
FIG. 1 illustrates an example wellbore having a casing and production tubing with an optical fiber for pressure sensing disposed within coiled tubing, according to certain embodiments of the present disclosure.

FIG. 1 illustrates a schematic cross-sectional view of a downhole completion and pressure sensing system 100. The system 100 generally includes a wellbore 102, casing 104, production tubing 106, coiled tubing 114, and conductor 112 (disposed in the coiled tubing 114). The conductor 112 may be optically conductive (e.g., an optical waveguide or optical cable with multiple waveguides) and/or electrically conductive (e.g., a wire or electrical cable with multiple wires). At least a portion of the system 100 may be disposed adjacent one or more reservoirs 108 downhole.

The wellbore 102 may have casing 104 disposed within, through which production tubing 106 may be deployed as part of a wellbore completion. Sensing devices 116 may be installed downhole by including the sensing devices in the coiled tubing 114 or coupling the sensing devices in line with the coiled tubing. The sensing devices 116 may perform pressure measurements related to the wellbore 102 and may transmit pressure measurements using the conductor 112 to a processing system (not shown), which may be located at the surface. Properties of the wellbore 102, a wellbore completion (e.g., casing, cement, production tubing, packers), and/or downhole formations and interstitial fluid properties surrounding or otherwise adjacent the wellbore 102 may be monitored over time based on the pressure measurements (e.g., using the processing system). Further, hydrocarbon production may be controlled, or reservoirs 108 may be managed, based on the pressure measurements.

Example Pressure Gauge Insensitive to Extraneous Mechanical Loadings

Figure 2A:
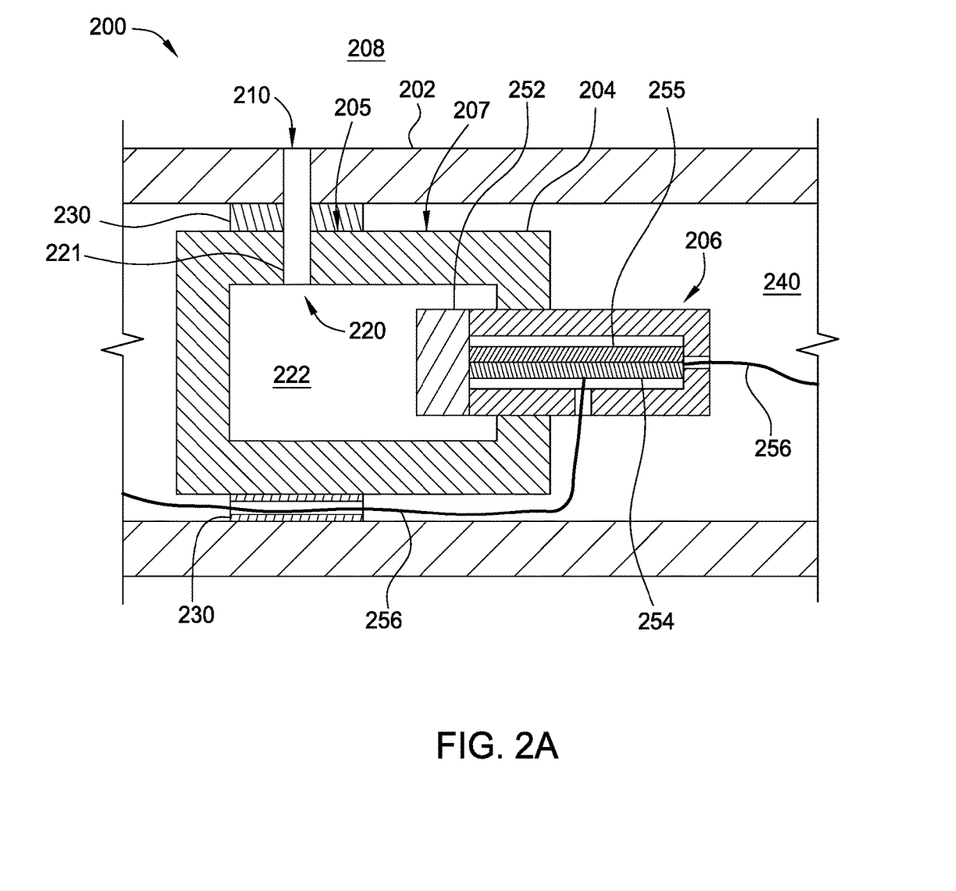
FIGS. 2A and 2B illustrate example pressure gauges, according to certain embodiments of the present disclosure.

FIG. 2A is a cut-away view of a schematic illustration of an example pressure gauge 200 that is insensitive to extraneous mechanical loadings, according to aspects of the present disclosure. The pressure gauge 200 includes a housing 202 (e.g., an outer shell component), a chamber 204 (e.g., a pressure chamber), and a pressure sensor assembly 206. The chamber 204 and the pressure sensor assembly 206 are disposed inside the housing 202. The housing 202 has a first port 210 in fluid communication with the environment 208 that is external to the housing 202. The chamber 204 has a second port 220 that is coupled to the first port 210 of the housing 202. The first port 210 and the second port 220 enable a volume 222 inside the chamber to be in fluid communication with the environment 208 (e.g., via a channel, such as duct 221).

Certain loads placed on the housing 202 may be referred to as extraneous loads, in that these loads do not affect the pressure of the environment, and it is undesirable for these loads to affect the pressure response (e.g., a measurement of the pressure) of the pressure sensor assembly 206.

The chamber 204 may be connected with the housing 202. The chamber 204 may be mechanically coupled to the housing 202 via a region 205 of the exterior surface 207 of the chamber 204. The region 205 may be small (e.g., less than one-half) when compared to the exterior surface 207 and at such a distance from the pressure sensor assembly 206 that a mechanical loading applied to the housing 202 does not result in a mechanical loading being applied to the pressure sensor assembly. For example, an extraneous mechanical loading (e.g., a radial compressive load) applied to the housing 202 may result in the housing 202 and the chamber 204 being compressed and/or deformed, but a fluid within the volume 222 is in fluid communication with the external environment 208 and remains at the same pressure as the pressure in the external environment 208. In a second example, an extraneous mechanical loading (e.g., a bending moment) applied to the housing 202 may result in the housing 202 bending and the chamber 204 displacing from a first position to a second position, but the pressure sensor assembly 206 is not rigidly connected to any item other than the chamber 204 and therefore displaces with the chamber 204. Thus, a pressure response of the pressure sensor assembly 206 is independent of extraneous mechanical loadings on the housing 202. That is, even if the housing 202 is bent, placed under torsion, or otherwise mechanically loaded, the pressure response of the pressure sensor assembly 206 may be unaffected by the loads placed on the housing 202.

The chamber 204 may be connected with at least one mechanical coupling 230 that is connected with the housing 202. That is, a mechanical coupling 230 may connect the housing 202 with the region 205 of the chamber 204. To aid with isolation of the pressure sensor assembly 206 from extraneous mechanical loadings on the housing 202, the axial length of the chamber 204 may be substantially longer (e.g., at least 3 to 10 times longer) than a length of the mechanical coupling 230 along the region 205. For some embodiments, the chamber is mechanically coupled to the housing (e.g., via at least one mechanical coupling 230) at only one end (or end region) of the chamber 204. As used herein, an "end region" of the chamber 204 generally refers to the general area more towards the end of the chamber 204 rather than towards the middle, such that the chamber 204 has a middle region between two end regions. The middle region and two end regions are not necessarily divided into equal thirds.

The first port 210, second port 220, chamber 204, and pressure sensor assembly 206 may be connected in such a manner that a volume 240 within the housing 202 is not in fluid communication with any of the environment 208, the first port 210, the second port 220, or the volume 222.

The pressure sensor assembly 206 may be at least partially disposed in the chamber 204. The pressure sensor assembly 206 may be connected with the chamber 204 in such a manner that the pressure sensor assembly 206 can measure a pressure of a fluid in the volume 222 that is within the chamber 204.

For some embodiments, the pressure sensor assembly 206 may comprise a pressure-responsive member 252 (e.g., a bellows, a diaphragm, or a tube) and an optical waveguide 254 with a strain-sensitive element. Examples of strain-sensitive elements include reflective elements, such as Bragg gratings and Fabry-Perot cavities, and transmissive elements, such as long period gratings. With such a pressure sensor assembly 206, a change in pressure in the volume 222 changes forces on the pressure-responsive member 252. The pressure-responsive member 252 transfers the forces to the optical waveguide 254, altering a strain of the optical waveguide 254 that may alter properties, such as a characteristic wavelength ($\lambda_0$), of the strain-sensitive element and/or of the optical waveguide 254.

In an embodiment of the present disclosure, the optical waveguide 254 may be connected with the pressure-responsive member 252 and under a tension or compression load when the pressure sensor assembly 206 is assembled. That is, the optical waveguide 254 may be under tension or compression when the pressure sensor assembly 206 is exposed to atmospheric pressure, and when the pressure sensor assembly 206 is exposed to pressure at a measurement location, the load in the optical waveguide 254 may change, which changes one or more properties of the strain-sensitive element and/or of the optical waveguide 254.

In another embodiment of the present disclosure, the optical waveguide 254 may be attached (e.g., bonded) to a substrate 255 that is coupled to the pressure-responsive member 252. The substrate 255 may not be under tension or compression when the pressure sensor assembly 206 is exposed to atmospheric pressure. When the pressure sensor assembly 206 is exposed to pressure at a measurement location, the substrate 255 may be stretched (e.g., placed under tension) or compressed (e.g., placed under compression). The substrate 255 is strained in response to being stretched or compressed, and the optical waveguide 254 is also strained because the optical waveguide 254 is attached to the substrate 255. The strain in the optical waveguide may change one or more properties of the optical waveguide 254 and/or the strain-sensitive element(s).

An optical waveguide 256 (e.g., an optical fiber) may be used to carry light (e.g., in pulses or continuous-wave (CW)) interrogating the pressure sensor assembly 206 to the optical waveguide 254 and to carry signals (e.g., reflections) from the strain-sensitive element to a sensing device. The optical waveguide 256 may also be connected with other sensors to deliver light to the other sensors and carry signals from the other sensors. For some embodiments, the optical waveguide 256 may be spliced or otherwise suitably attached to the optical waveguide 254. For other embodiments, the optical waveguide 256 may be a continuation of the same optical waveguide 254.

Signals from a plurality of sensors may be multiplexed in a single optical waveguide 256. The signals from the individual sensors may be differentiated by means of wavelength division multiplexing (WDM) and/or time division multiplexing (TDM). If signals from different sensors are differentiated by the signals using different wavelengths (e.g., light of different colors), then that type of multiplexing of signals may be referred to as wavelength division multiplexing. If signals from different sensors are differentiated by the times of arrival of the signals (e.g., times of responses from an interrogating light pulse), then that type of multiplexing of signals may be referred to as time division multiplexing. Both types of multiplexing can be used along a single optical waveguide 256.

While the pressure gauge 200 is described in terms of a pressure sensor assembly 206 that utilizes a pressure-responsive member 252 and an optical waveguide 254, the disclosure is not so limited and other types of pressure sensors may be used in a pressure gauge that is insensitive to external mechanical loadings. For example, a piezoresistive strain gauge may change resistance when strained as a result of pressure applied to the pressure-responsive member 252, and measurements of the resistance may be used to determine the pressure in the volume 222. In another example, the pressure-responsive member 252 may be a diaphragm. The diaphragm and a cavity may form a capacitor, with the diaphragm exposed to the pressure within the volume 222. In this example, a change in pressure of the volume 222 may cause a change in the geometry of the diaphragm and cavity, resulting in a change in the capacitance of the capacitor that can be measured to determine the pressure in the volume 222.

In an embodiment of the present disclosure, the pressure gauge 200 may be attached (e.g., strapped) to the outside of the production tubing as the production tubing is assembled at a drilling rig, for example. The optical waveguide 256 may be continuously unspooled and clamped in place on the production tubing as the production tubing is assembled. Other types of pressure gauges may need to be connected (e.g., spliced and/or welded) to a sensing cable (comprising, for example, one or more optical waveguides and/or electrically conductive wires) at proper locations. Connecting such other types of pressure gauges to sensing cables during assembly of production tubing may both take more time to assemble than embodiments of the present disclosure and suffer increased reliability risk as compared to embodiments of the present disclosure.

Figure 2B:
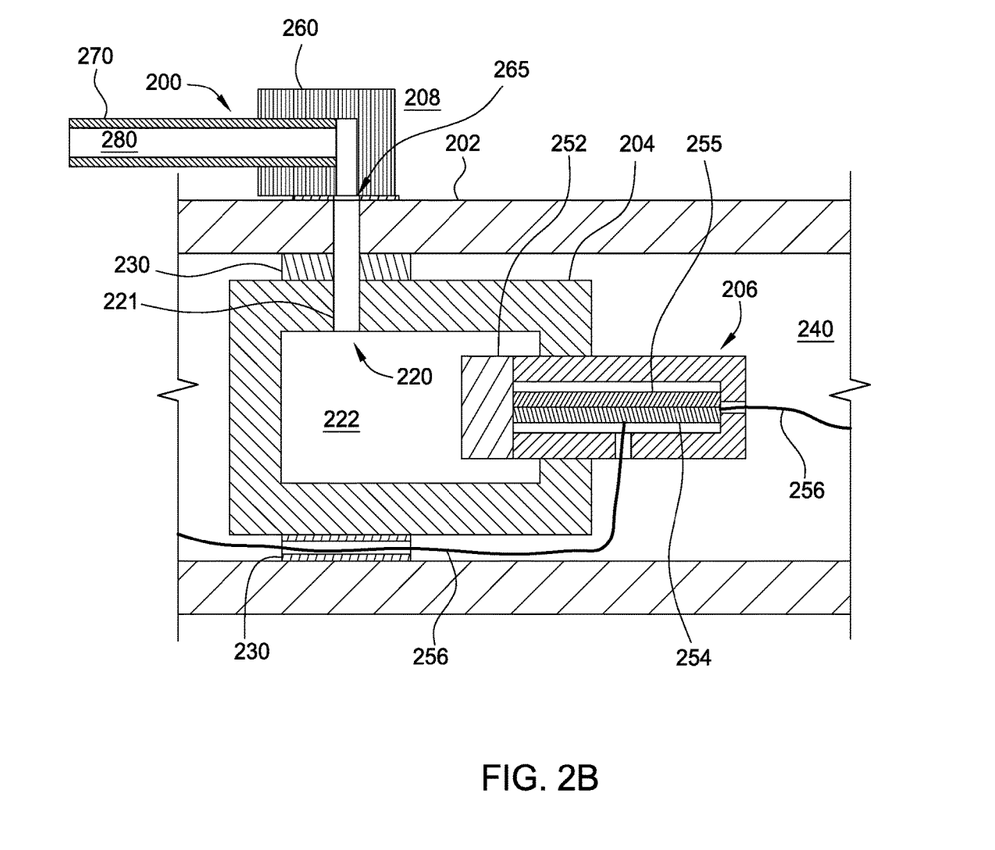

FIG. 2B is a cut-away view of a schematic illustration of the example pressure gauge 200 of FIG. 2A with additional parts. For some embodiments, the pressure gauge 200 may be used to measure pressures in a location away from the pressure gauge 200, for example in production tubing to which the pressure gauge 200 is attached. The example pressure gauge 200 shown in FIG. 2B includes a pressure-conveying tube 270, an interface block 260 for interfacing between the pressure-conveying tube and the housing 202, and a pressure seal 265. The interface block 260 and pressure seal 265 are attached to the housing 202 in such a manner that the first port 210 (see FIG. 2A) of the pressure gauge is aligned with a through-hole in the pressure seal 265 and a port of the interface block 260. Thus, the interior 280 of the pressure-conveying tube 270 is in fluid communication with the volume 222 inside the chamber 204. The pressure seal 265 is configured to prevent fluid leakage from the exterior environment 208 into the volume 222 and the interior 280 of the pressure-conveying tube 270. The pressure seal 265 also is configured to prevent fluid leakage from the volume 222 and the interior 280 of the pressure-conveying tube 270 into the exterior environment 208.

The pressure-conveying tube 270 may be in fluid communication with the location from which pressure measurements are to be collected. Pressure from the location from which pressure measurements are to be collected may be conveyed via fluids within the pressure-conveying tube 270, the interface block 260, the pressure seal 265, the first port 210 (see FIG. 2A), the duct 221, and the second port 220 to the volume 222. The pressure within the volume 222 may then be measured to determine a pressure measurement associated with the location from which pressure measurements are to be collected.

Figure 3:
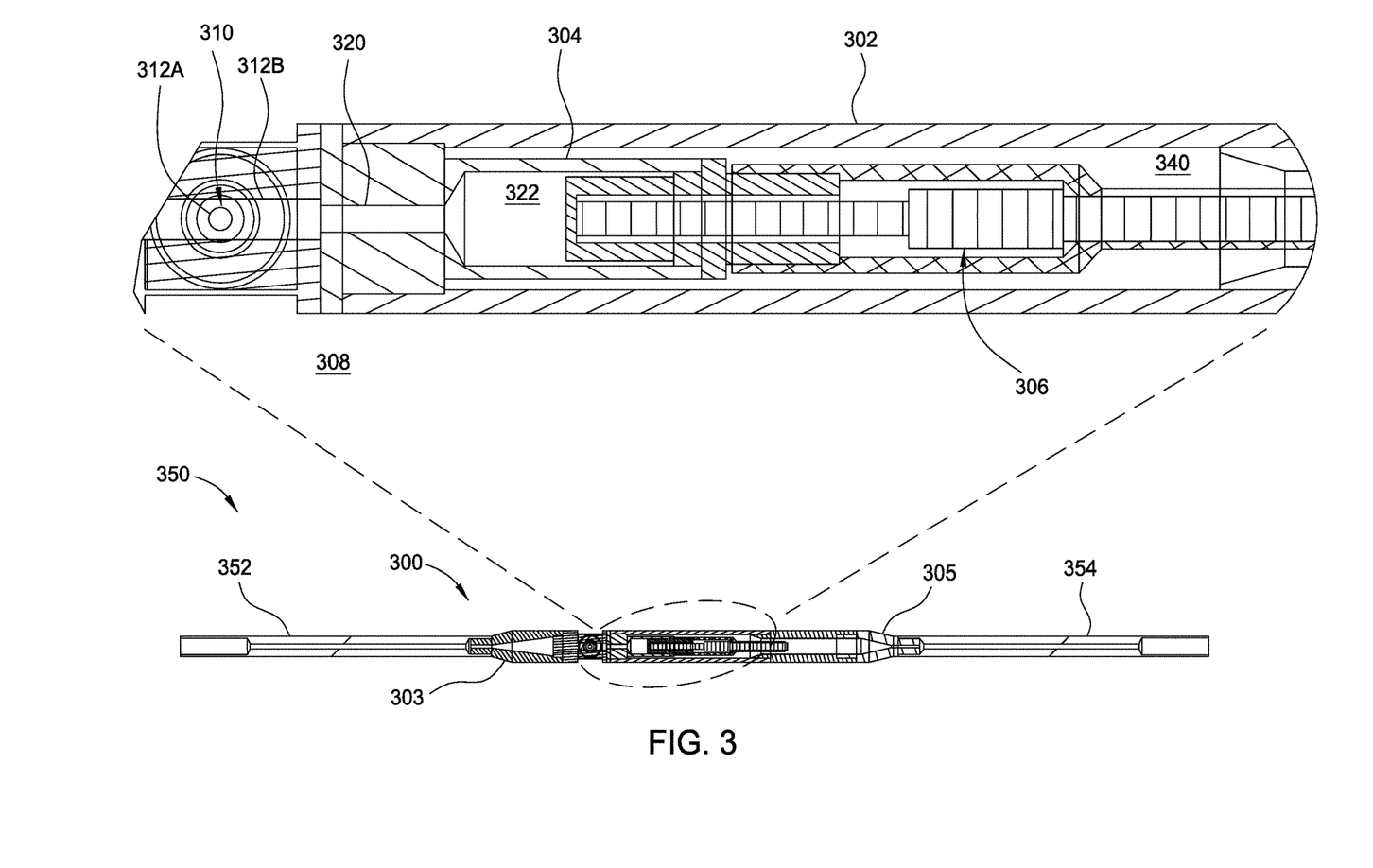
FIG. 3 illustrates an example pressure gauge coupled to downhole tubing at each end, according to certain embodiments of the present disclosure.

FIG. 3 illustrates a cut-away view of an example pressure gauge 300 that is insensitive to external mechanical loadings, according to aspects of the present disclosure. Similar to the schematic shown in FIG. 2A, the pressure gauge 300 includes a housing 302, a chamber 304, and a pressure sensor assembly 306. The chamber 304 and the pressure sensor assembly 306 are disposed inside the housing 302. The housing 302 has a first port 310 in fluid communication with an environment 308 that is external to the housing 302. The chamber 304 has a second port 320 that is coupled to the first port 310 of the housing 302. While the first port 310 includes two channels 312A and 312B that intersect, the disclosure is not so limited, and the first port may comprise any number of channels, intersections, and/or bends that enable the second port 320 to be in fluid communication with the environment 308. While the second port 320 is shown as a single channel, similarly to the first port 310, the second port 320 may also comprise any number of channels, intersections, and/or bends that enable the volume 322 to be in fluid communication with the first port 310 and the environment 308.

The chamber 304 may be connected with the housing 302. The first port 310, second port 320, chamber 304, and pressure sensor assembly 306 may be connected in such a manner that a volume 340 within the housing 302 is not in fluid communication with any of the environment 308, the first port 310, the second port 320, or the volume 322.

The pressure sensor assembly 306 may be at least partially disposed in the chamber 304. The pressure sensor assembly 306 may be connected with the chamber 304 in such a manner that the pressure sensor assembly 306 can measure pressure of a fluid in the volume 322 within the chamber 304.

In an embodiment of the present disclosure, the pressure gauge 300 may be assembled with a length of downhole tubing 350 by joining the pressure gauge 300 to a first length 352 and a second length 354 of downhole tubing. The pressure gauge 300 may be joined to the first length 352 and to the second length 354 using any suitable technique or combination of techniques. For example, axial ends of the pressure gauge 300 may be welded to the first length 352 and the second length 354. In other embodiments, the axial ends of the pressure gauge 300 may be mated via a pressure-tight seal (e.g., preventing fluid leakage) with axial ends of the first length 352 and the second length 354.

The first length 352 and second length 354 of continuous downhole cable shown may each have an outer diameter of approximately 0.25 inches (=¼"). The housing 302 of the pressure gauge 300 may have an outer diameter between 0.25 inches and 0.50 inches (e.g., 0.375 inches =⅜"). For some embodiments, the housing 302 may have tapered ends 303 and 305. The tapered ends 303 and 305 of the housing 302 may facilitate insertion of the continuous downhole cable 350 into a wellbore (e.g., wellbore 102 shown in FIG. 1) by allowing for a smooth transition from the first length 352 to the pressure gauge 300 and from the pressure gauge 300 to the second length 354, thus reducing a probability that the pressure gauge 300 will be caught on obstructions (e.g., other equipment) within the wellbore during deployment or removal.

While the pressure gauge 300 is described in terms of a pressure gauge having an outer diameter between 0.25 inches and 0.50 inches being joined to tubing that has an outer diameter of approximately 0.25 inches, the disclosure is not so limited. In particular, when used with tubing that is of a larger diameter, a pressure gauge that is insensitive to extraneous mechanical loadings may have a housing with an outer diameter that matches the diameter of the tubing. In such a case, the housing of the pressure gauge would not have tapered ends (e.g., tapered ends 303 and 305 shown in FIG. 3).

Figure 4:
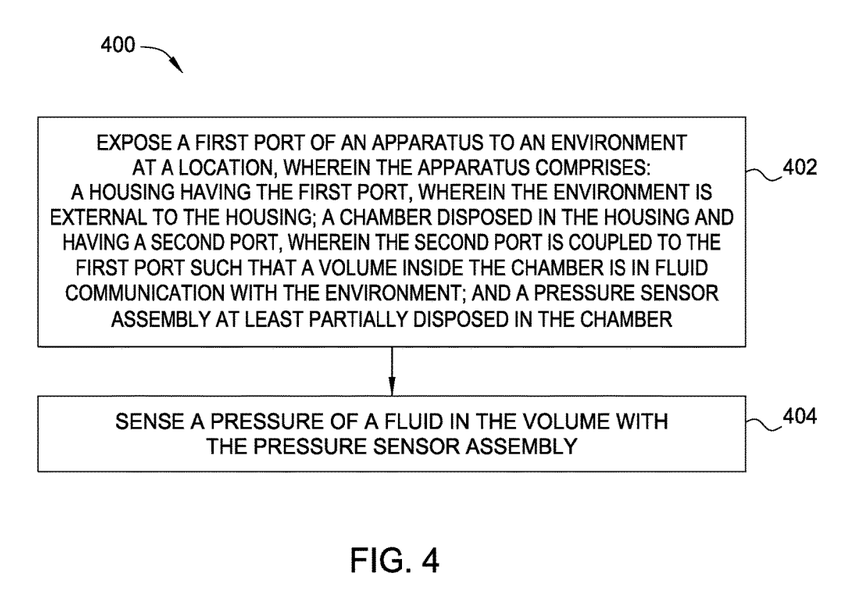
FIG. 4 is a flow diagram of example operations for sensing pressure, according to certain embodiments of the present disclosure.

FIG. 4 is a flow diagram of example operations 400 for sensing pressure, according to certain aspects of the present disclosure. The operations 400 may be performed using an apparatus for sensing pressure, such as a pressure gauge that is insensitive to extraneous mechanical loadings (e.g., pressure gauge 200 or pressure gauge 300).

The operations 400 may begin at block 402 by exposing a first port (e.g., port 210) of an apparatus to an environment (e.g., environment 208) at a location (e.g., a depth downhole). The apparatus generally includes a housing (e.g., housing 202) having the first port, a chamber (e.g., chamber 204) disposed in the housing, and a pressure sensor assembly (e.g., pressure sensor assembly 206) at least partially disposed in the chamber. The environment may be external to the housing. The chamber may have a second port, (e.g., port 220) coupled to the first port such that a volume (e.g., volume 222) in the chamber is in fluid communication with the environment. The chamber may be mechanically coupled to the housing via a portion of an exterior surface (e.g., at only one end region) of the chamber such that a pressure response of the pressure sensor assembly is independent of extraneous loading on the housing. For some embodiments, the extraneous loading on the housing includes radial compression or a bending moment on the housing. At block 404, the apparatus may sense a pressure of a fluid in the chamber with the pressure sensor assembly.

For some embodiments, the operations 400 may further involve conveying the fluid from another environment external to the housing to the chamber. The fluid may be conveyed via a pressure-conveying tube. A first end of the pressure-conveying tube may be connected with and in fluid communication with the first port, and a second end of the pressure-conveying tube may be in fluid communication with the other environment external to the housing.

It is understood that the specific order or hierarchy of steps in the processes disclosed above is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." For example, unless specified otherwise or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

While the foregoing is directed to embodiments of the present disclosure, other and further embodiments of the disclosure may be devised without departing from the basic scope thereof, and the scope thereof is determined by the claims that follow.

The invention claimed is:

1. An apparatus for sensing pressure, comprising:
  a housing having a first port;
  a chamber disposed in the housing and having a second port, wherein an exterior surface of the chamber is exposed to a volume inside the housing, an inner surface of the chamber defines a volume inside the chamber, the second port is coupled to the first port such that the volume inside the chamber is in fluid communication with an environment external to the housing; and
  a pressure sensor assembly at least partially disposed in the chamber and configured to sense a pressure of a fluid in the chamber, wherein the pressure sensor assembly comprises a pressure-responsive member disposed in the chamber and exposed to the fluid in the chamber, the pressure-responsive member comprises a bellows or a diaphragm disposed near a first end region of the chamber, the chamber is mechanically coupled to the housing via a portion of the exterior surface of the chamber near a second end region of the chamber, and the first end region and the second end region are on opposing ends of an axis of the chamber such that a pressure response of the pressure sensor assembly is independent of extraneous loading on the housing.

2. The apparatus of claim 1, further comprising:
  at least one mechanical coupling connecting the housing with the chamber at only the first end region of the chamber.

3. The apparatus of claim 2, wherein a length of the chamber is substantially longer than a length of the at least one mechanical coupling.

4. The apparatus of claim 1, further comprising:
  a pressure-conveying tube, wherein a first end of the pressure-conveying tube is connected with and in fluid communication with the first port, and a second end of the pressure-conveying tube is in fluid communication with another environment external to the housing.

5. The apparatus of claim 1, wherein the volume inside the housing is isolated from the volume inside the chamber and the environment external to the housing.

6. The apparatus of claim 1, wherein the pressure sensor assembly comprises an optical waveguide having one or more Bragg gratings.

7. The apparatus of claim 6, further comprising:
  an optical conductor connected with the pressure sensor assembly and configured to convey, along a length of the housing, a signal indicative of the sensed pressure.

8. The apparatus of claim 1, wherein the first port is coupled to the second port via a tube.

9. The apparatus of claim 1, further comprising:
  a conductor connected with the pressure sensor assembly and configured to convey, along a length of the housing, a signal indicative of the sensed pressure.

10. The apparatus of claim 9, wherein the conductor comprises an electrical wire.

11. The apparatus of claim 1, wherein the housing is configured to connect with at least one section of tubing.

12. The apparatus of claim 1, wherein the apparatus comprises a spoolable pressure gauge.

13. The apparatus of claim 1, wherein the housing has an outer diameter between ¼" and ½" inclusive.

14. The apparatus of claim 1, wherein the chamber comprises first and second ends, wherein the first end has an aperture therein, and wherein the pressure sensor assembly is at least partially disposed in the chamber via the aperture.

15. The apparatus of claim 14, wherein the second port is disposed in a surface of the chamber nearer to the second end than to the first end.

16. The apparatus of claim 1, wherein the pressure-responsive member comprises the diaphragm, wherein the diaphragm forms a portion of a capacitor, and wherein the sensed pressure is based on a capacitance of the capacitor.

17. The apparatus of claim 1, wherein the pressure-responsive member comprises the diaphragm and wherein the diaphragm is fully enclosed within the chamber.

18. A method for sensing pressure, comprising:
  exposing a first port of an apparatus to an environment at a location, wherein the apparatus comprises:
    a housing having the first port, wherein the environment is external to the housing;
    a chamber disposed in the housing and having a second port, wherein an exterior surface of the chamber is exposed to a volume inside the housing, an inner surface of the chamber defines a volume inside the chamber, the second port is coupled to the first port such that the volume inside the chamber is in fluid communication with the environment; and
    a pressure sensor assembly at least partially disposed in the chamber, wherein the pressure sensor assembly comprises a pressure-responsive member exposed to the fluid in the chamber, the pressure-responsive member comprises a bellows or a diaphragm disposed near a first end region of the chamber, the chamber is mechanically coupled to the housing via a portion of the exterior surface of the chamber near a second end region of the chamber, and the first end region and the second end region are on opposing ends of an axis of the chamber such that a pressure response of the pressure sensor assembly is independent of extraneous loading on the housing; and
  sensing a pressure of a fluid in the chamber with the pressure sensor assembly.

19. The method of claim 18, further comprising:
  conveying the fluid from another environment external to the housing to the chamber via a pressure-conveying tube, wherein a first end of the pressure-conveying tube is connected with and in fluid communication with the first port, and a second end of the pressure-conveying tube is in fluid communication with the other environment external to the housing.

20. A system for sensing pressure, comprising:
a conductor;
an apparatus comprising:
- a housing having a first port;
- a chamber disposed in the housing and having a second port, wherein an exterior surface of the chamber is exposed to a volume inside the housing, an inner surface of the chamber defines a volume inside the chamber, the second port is coupled to the first port such that the volume inside the chamber is in fluid communication with an environment external to the housing; and
- a pressure sensor assembly at least partially disposed in the chamber and configured to sense a pressure of a fluid in the chamber, wherein the pressure sensor assembly comprises a pressure-responsive member exposed to the fluid in the chamber, the pressure-responsive member comprises a bellows or a diaphragm disposed near a first end region of the chamber, the chamber is mechanically coupled to the housing via a portion of the exterior surface of the chamber near a second end region of the chamber, and the first end region and the second end region are on opposing ends of an axis of the chamber such that a pressure response of the pressure sensor assembly is independent of extraneous loading on the housing; and a processor configured to process signals received from the pressure sensor assembly via the conductor.

* * * * *